US008861480B2

(12) United States Patent
Chin et al.

(10) Patent No.: US 8,861,480 B2
(45) Date of Patent: Oct. 14, 2014

(54) METHODS AND SYSTEMS FOR INTER-RAT HANDOVER IN MULTI-MODE MOBILE STATION

(75) Inventors: Tom Chin, San Diego, CA (US);
Guangming Carl Shi, San Diego, CA (US); Kuo-Chun Lee, San Diego, CA (US); Serguei A. Glazko, San Diego, CA (US); Matthias Brehler, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 606 days.

(21) Appl. No.: 12/610,293

(22) Filed: Oct. 31, 2009

(65) Prior Publication Data

US 2010/0111214 A1 May 6, 2010

Related U.S. Application Data

(60) Provisional application No. 61/112,139, filed on Nov. 6, 2008.

(51) Int. Cl.
*H04W 36/18* (2009.01)
*H04W 36/00* (2009.01)

(52) U.S. Cl.
CPC ...... *H04W 36/0083* (2013.01); *H04W 36/0066* (2013.01)
USPC .......................................... 370/334; 455/442

(58) Field of Classification Search
USPC ............ 370/310.2, 328–339, 349; 455/422.1, 455/432.1, 436–444
See application file for complete search history.

(56) References Cited

U.S. PATENT DOCUMENTS

| 7,545,787 B2 | 6/2009 | Bitran et al. |
| 2006/0077928 A1 | 4/2006 | Amano |

(Continued)

FOREIGN PATENT DOCUMENTS

| CN | 101189905 A | 5/2008 |
| EP | 1587338 | 10/2005 |

(Continued)

OTHER PUBLICATIONS

International Search Report & Written Report—PCT/US09/063183, International Search Authority—European Patent Office—Feb. 15, 2010.

(Continued)

*Primary Examiner* — Hoon J Chung
(74) *Attorney, Agent, or Firm* — Tyler J. Overall

(57) ABSTRACT

Methods provided may generally include sending a BS of a first RAT a request message indicating a set of MIMO resources to reallocate; during a scan duration, communicating with the BS of the first RAT using non-reallocated MIMO resources and communicating with a BS of a second RAT using reallocated MIMO resources; and during a normal duration, communicating with the BS of the first RAT using the reallocated and non-reallocated MIMO resources. Apparatus provided may generally include logic for receiving a request message indicating a set of MIMO resources of the MS to reallocate; logic for, during a scan duration, communicating with the MS in a first transmission mode assuming the use of only non-reallocated MIMO resources by the MS; and logic for, during a normal duration, communicating with the MS in a second transmission mode assuming the use of the reallocated and non-reallocated MIMO resources by the MS.

32 Claims, 8 Drawing Sheets

MIMO Configuration 1

MIMO Configuration 2

(56) References Cited

U.S. PATENT DOCUMENTS

| | | | |
|---|---|---|---|
| 2006/0120477 A1 | 6/2006 | Shen et al. | |
| 2006/0276189 A1* | 12/2006 | Kiernan et al. | 455/436 |
| 2007/0060146 A1 | 3/2007 | Won et al. | |
| 2007/0183383 A1* | 8/2007 | Bitran et al. | 370/338 |
| 2009/0047958 A1* | 2/2009 | Rimhagen et al. | 455/436 |
| 2009/0310562 A1* | 12/2009 | Medapalli | 370/331 |

FOREIGN PATENT DOCUMENTS

| | | | |
|---|---|---|---|
| EP | 1626600 | 2/2006 | |
| JP | 2006093813 A | 4/2006 | |
| JP | 2006180320 A | 7/2006 | |
| JP | 2008113149 A | 5/2008 | |
| WO | WO2006105547 | 10/2006 | |
| WO | WO 2006/130063 A1 * | 12/2006 | H04Q 7/38 |
| WO | 2008085176 A1 | 7/2008 | |

OTHER PUBLICATIONS

Kwon T., et al., "Design and Implementation of a Simulator Based on a Cross-Layer Protocol Between MAC and PHY Layers in a Wibro Compatible IEEE 802.16e OFDMA System", IEEE Communications Magazine, Dec. 31, 2005, vol. 43, No. 12, pp. 136-146.

Taiwan Search Report—TW098137626—TIPO—Jan. 21, 2013.

* cited by examiner

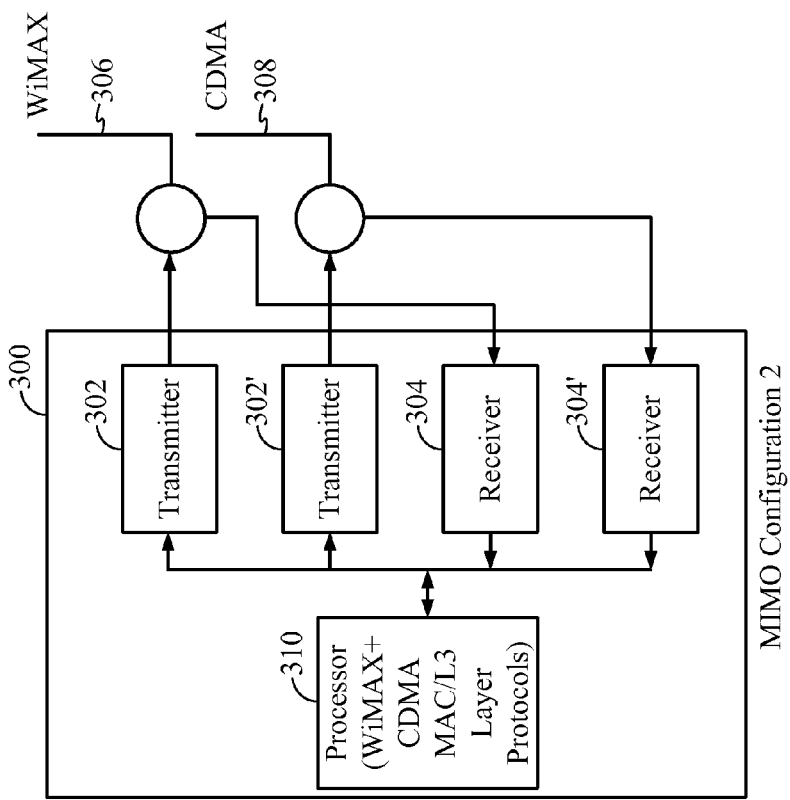
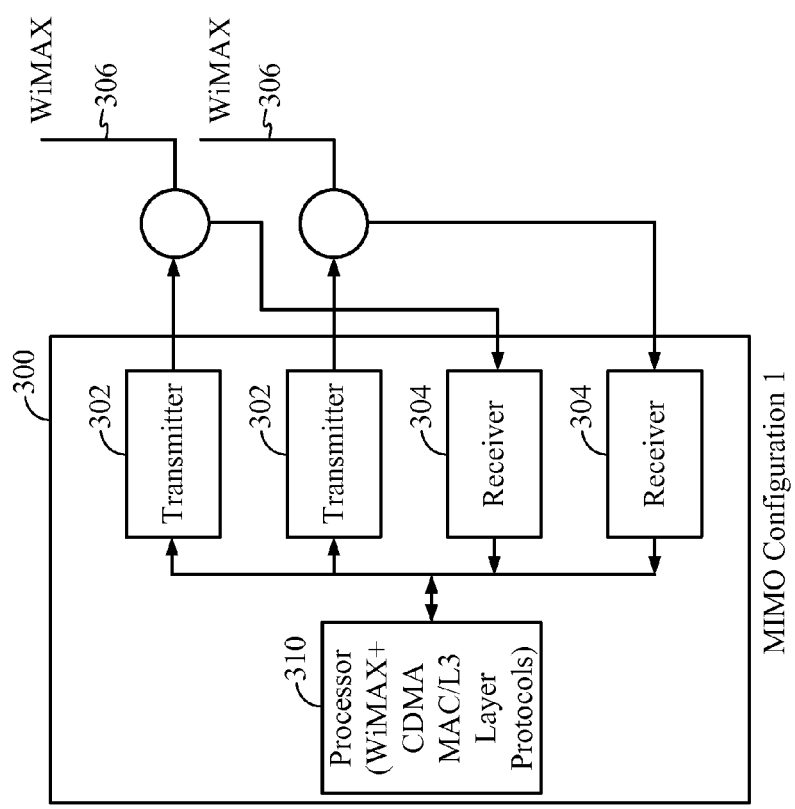
FIG. 3

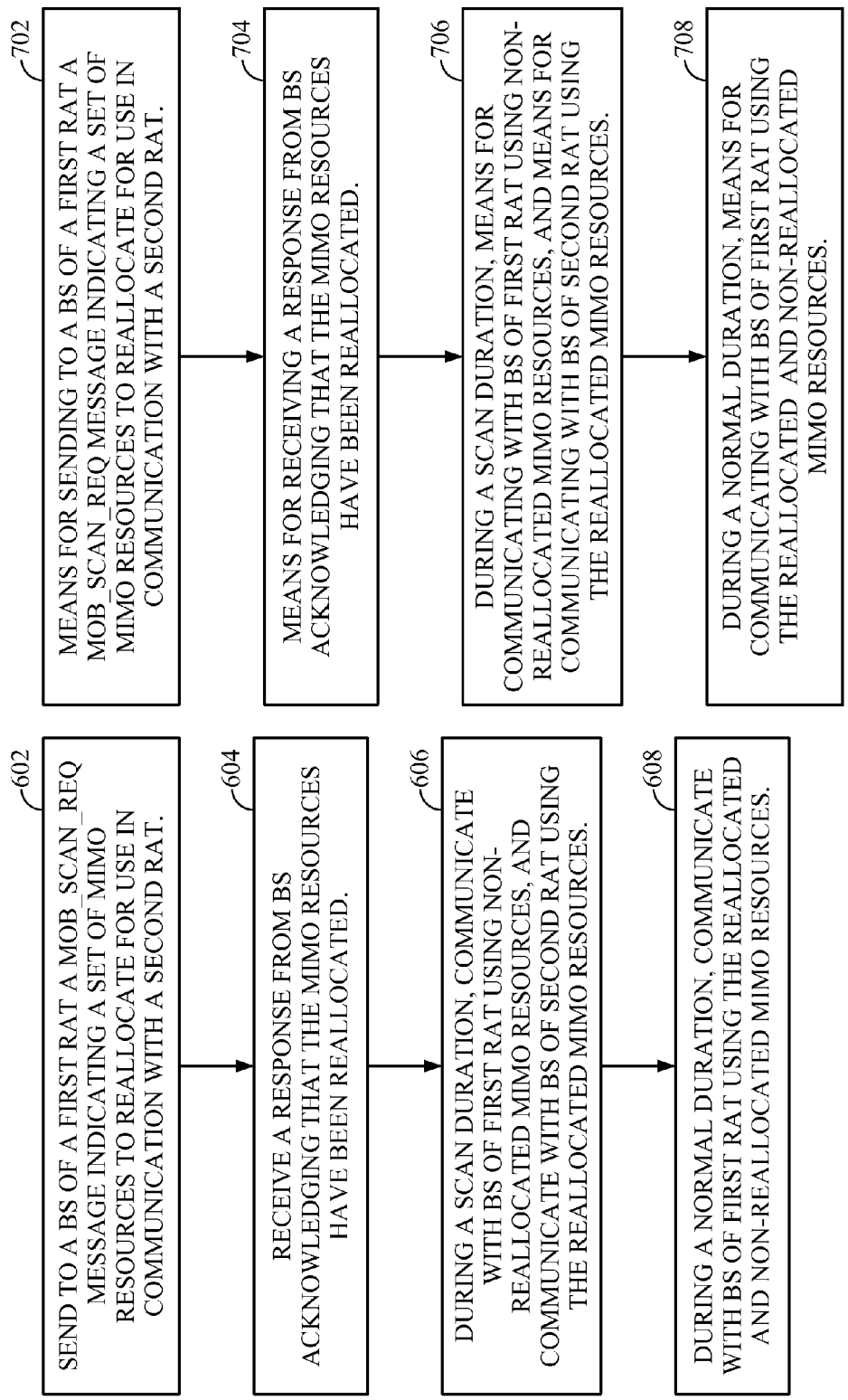

METHODS AND SYSTEMS FOR INTER-RAT HANDOVER IN MULTI-MODE MOBILE STATION

CLAIM OF PRIORITY

This patent application claims the benefit of priority from U.S. Provisional Patent Application Ser. No. 61/112,139, entitled "Method and Apparatus for Smooth Inter-RAT Handover with Reduced MIMO Capability for Multi-Mode WiMAX Mobile Station" and filed Nov. 6, 2008, which is assigned to the assignee of this application and is fully incorporated herein by reference for all purposes.

FIELD

The present disclosure generally relates to communication, and more specifically, to provide a method to reallocate resources in a mobile station multi-input multi output to provide operation for communication between WiMAX and another radio access technology (RAT).

BACKGROUND

In WiMAX systems, a mobile station (MS) may be able to support multi-input, multi-output (MIMO) operations in which the MS can have multiple transmit and receive antennas.

To support a smooth handover between the WiMAX network and another RAT, such as CDMA and UMTS, an MS may be provisioned with circuitry allowing concurrent transmission and reception in multiple RATs. Unfortunately, this implies multiple sets of radio hardware at the MS, which increases cost and power consumption. In order to support multiple RATs with a single set of radio hardware, WiMAX supports a scanning mode, where the MS is allowed to leave the WiMAX network.

Unfortunately, scanning is disruptive to any active WiMAX service, as during conventional scanning, the MS cannot transmit and receive with the WiMAX network.

SUMMARY

Certain embodiments provide a method for communicating with a first radio access technology (RAT) and a second RAT. The method generally includes sending a base station (BS) of a first RAT a request message indicating a set of multi-input, multi-output (MIMO) resources to reallocate; during a scan duration, communicating with the BS of the first RAT using non-reallocated MIMO resources and communicating with a BS of the second RAT using the reallocated MIMO resources; and during a normal duration, communicating with the BS of the first RAT using the reallocated and non-reallocated MIMO resources.

Certain embodiments provide a method for communicating with a mobile station (MS). The method generally includes receiving, by a BS of a RAT, a request message indicating a set of MIMO resources of the MS to reallocate; during a scan duration, communicating with the MS in a first transmission mode assuming the use of only non-reallocated MIMO resources by the MS; and during a normal duration, communicating with the MS in a second transmission mode assuming the use of the reallocated and non-reallocated MIMO resources by the MS.

Certain embodiments provide an apparatus for communicating with a first RAT and a second RAT. The apparatus generally includes logic for sending a BS of a first RAT a request message indicating a set of MIMO resources to reallocate; logic for, during a scan duration, communicating with the BS of the first RAT using non-reallocated MIMO resources and communicating with a BS of the second RAT using the reallocated MIMO resources; and logic for, during a normal duration, communicating with the BS of the first RAT using the reallocated and non-reallocated MIMO resources.

Certain embodiments provide an apparatus for communicating with an MS. The apparatus generally includes logic for receiving, by a BS of a RAT, a request message indicating a set of MIMO resources of the MS to reallocate; logic for, during a scan duration, communicating with the MS in a first transmission mode assuming the use of only non-reallocated MIMO resources by the MS; and logic for, during a normal duration, communicating with the MS in a second transmission mode assuming the use of the reallocated and non-reallocated MIMO resources by the MS.

Certain embodiments provide an apparatus for communicating with a first RAT and a second RAT. The apparatus generally includes means for sending a BS of the first RAT a request message indicating a set of MIMO resources to reallocate; means for, during a scan duration, communicating with the BS of the first RAT using non-reallocated MIMO resources and communicating with a BS of the second RAT using the reallocated MIMO resources; and means for, during a normal duration, communicating with the BS of the first RAT using the reallocated and non-reallocated MIMO resources.

Certain embodiments provide an apparatus for communicating with an MS. The apparatus generally includes means for receiving, by a BS of a RAT, a request message indicating a set of MIMO resources of the MS to reallocate; means for, during a scan duration, communicating with the MS in a first transmission mode assuming the use of only non-reallocated MIMO resources by the MS; and means for, during a normal duration, communicating with the MS in a second transmission mode assuming the use of the reallocated and non-reallocated MIMO resources by the MS.

Certain embodiments provide a computer-program storage apparatus for communicating with a first RAT and a second RAT, comprising a computer readable medium having a set of instructions stored thereon, the set of instructions being executable by one or more processors. The set of instructions generally include instructions for sending a BS of a first RAT a request message indicating a set of MIMO resources to reallocate, instructions for during a scan duration, communicating with the BS of the first RAT using non-reallocated MIMO resources and communicating with a BS of the second RAT using the reallocated MIMO resources, and instructions for during a normal duration, communicating with the BS of the first RAT using the reallocated and non-reallocated MIMO resources.

Certain embodiments provide computer-program storage apparatus for communicating with an MS, comprising a computer readable medium having a set of instructions stored thereon, the set of instructions being executable by one or more processors. The set of instructions generally include instructions for receiving, by a BS of a RAT, a request message indicating a set of MIMO resources of the MS to reallocate, instructions for during a scan duration, communicating with the MS in a first transmission mode assuming the use of only non-reallocated MIMO resources by the MS, and instructions for during a normal duration, communicating with the MS in a second transmission mode assuming the use of the reallocated and non-reallocated MIMO resources by the MS.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 3 illustrates an exemplary allocation of resources in accordance with certain embodiments set forth herein;

FIG. 6 illustrates example operations performed by an MS, in accordance with certain embodiments as set forth herein;

FIG. 7 illustrates an exemplary means for communicating with a BS in accordance with certain embodiments set forth herein;

DETAILED DESCRIPTION

Figure 1:
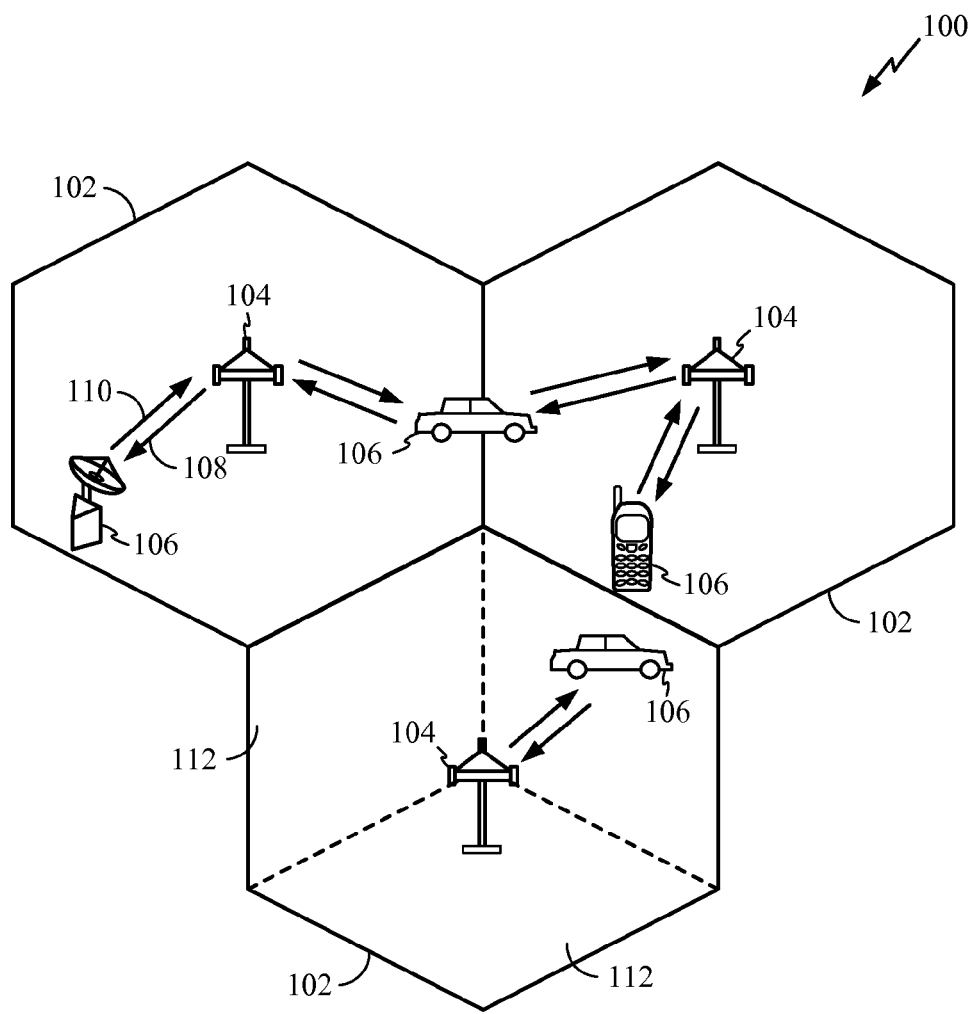
FIG. 1 illustrates an exemplary wireless communication system in accordance with certain embodiments set forth herein.

Certain embodiments are described herein with reference to the drawings, wherein like reference numerals are used to refer to like elements throughout. In the following description, for purposes of explanation, numerous specific details are set forth in order to provide a thorough understanding of certain embodiments. However, it may be that such embodiments can be practiced without these specific details. In other instances, well-known structures and devices are shown in block diagram form in order to facilitate describing certain embodiments.

Exemplary Wireless Communication System

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

One example of a communication system based on an orthogonal multiplexing scheme is a WiMAX system. WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an exemplary wireless communication system 100 in accordance with certain embodiments set forth herein. Wireless communication system 100 may be a broadband wireless communication system. The term "broadband wireless" refers to technology that at least provides wireless, audio, video, voice, Internet, and/or data network access. Wireless communication system 100 provides communication for one or more cells 102, each of which is serviced by a base station 104. Base station 104 may be a fixed station that communicates with user terminals 106 within cell 102 serviced by that base station 104. Base station 104 may alternatively be referred to as an access point, Node B or some other terminology.

As shown in FIG. 1, various user terminals 106 dispersed throughout wireless communication system 100. User terminals 106 may be fixed (i.e., stationary), mobile or capable of both. User terminals 106 may alternatively be referred to as remote stations, access terminals, terminals, subscriber units, mobile stations, stations, user equipment and the like. User terminals 106 may be personal wireless devices, such as cellular phones, personal digital assistants (PDAs), handheld devices, wireless modems, audio/video players, laptop computers, personal computers, other handheld communication devices, other handheld computing devices, satellite radios, global positioning systems, and so on. A variety of algorithms and methods may be used for transmissions in wireless communication system 100 between base stations 104 and user terminals 106. For example, signals may be sent and received between base stations 104 and user terminals 106 in accordance with OFDM/OFDMA techniques. If this is the case, wireless communication system 100 may be referred to as an OFDM/OFDMA system 100.

A communication link that facilitates transmission from base station 104 to user terminal 106 may be referred to as a downlink 108, and a communication link that facilitates transmission from user terminal 106 to base station 104 may be referred to as an uplink 110. Alternatively, downlink 108 may be referred to as a forward link or a forward channel, and uplink 110 may be referred to as a reverse link or a reverse channel. Cell 102 may be divided into multiple sectors 112. Sector 112 is a physical coverage area within cell 102. Base stations 104 within an OFDM/OFDMA system 100 may utilize antennas that concentrate the flow of power within a particular sector 112 of the cell 102. Such antennas may be referred to as directional antennas.

In certain embodiments, system 100 can be a multiple-input multiple-output (MIMO) communication system. Further, system 100 can utilize substantially any type of duplex technique to divide communication channels (e.g., forward link 108, reverse link 110, etc.) such as FDD, TDD, and the like. The channels can be provided for transmitting control data between mobile devices 106 and respective base stations 104.

Figure 2:
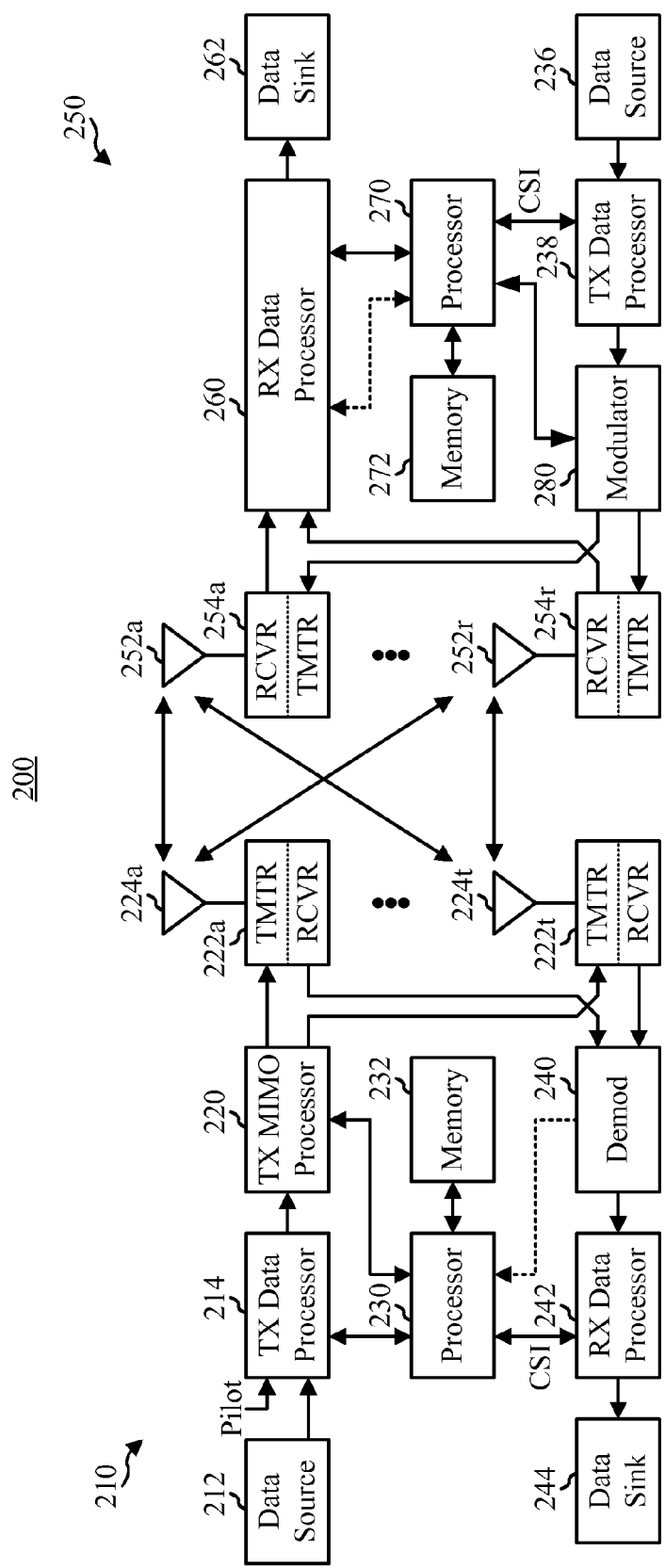
FIG. 2 illustrates an exemplary wireless network environment in accordance with certain embodiments set forth herein.

FIG. 2 illustrates an exemplary wireless network environment 200 in accordance with certain embodiments set forth herein. Wireless network environment 200 depicts one base station 210 and one mobile device 250 for sake of brevity. However, it is contemplated that system 200 can include one or more base stations and/or one or more mobile devices, wherein additional base stations and/or mobile devices can be substantially similar or different from illustrated base station 210 and illustrated mobile device 250 described herein. In addition, it is contemplated that base station 210 and/or mobile device 250 can employ the systems, techniques, configurations, embodiments, aspects, and/or methods described herein to facilitate wireless communication between them.

At base station 210, traffic data for a number of data streams is provided from a data source 212 to a transmit (TX) data processor 214. In certain embodiments, each data stream can be transmitted over a respective antenna and/or over multiple antennas. TX data processor 214 formats, codes, and interleaves the traffic data stream based on a particular coding scheme selected for that data stream to provide coded data.

The coded data for each data stream can, for example, be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 250 to estimate channel response or other communication parameters and/or characteristics. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides Nt modulation symbol streams to Nt transmitters (TMTR) 222a through 222t. In certain embodiments, TX MIMO processor 220 applies certain multi-antenna techniques, such spatial multiplexing, diversity coding or precoding (i.e., beamforming, with weights being applied to the modulation symbols of the data streams and to the antenna from which the symbol is being transmitted).

Each transmitter 222 receives and processes a respective modulation symbol stream to provide one or more analog signals, and further conditions (e.g., amplifies, filters, upconverts, etc.) the analog signals to provide a modulated signal suitable for transmission over the MIMO channel. Further, Nt modulated signals from transmitters 222a through 222t are transmitted from Nt antennas 224a through 224t, respectively.

At mobile device 250, the transmitted modulated signals are received by Nr antennas 252a through 252r and the received signal from each antenna 252 is provided to a respective receiver (RCVR) 254a through 254r. Each receiver 254 conditions (e.g., filters, amplifies, downconverts, etc.) a respective signal, digitizes the conditioned signal to provide samples, and further processes the samples to provide a corresponding "received" symbol stream.

A receive (RX) data processor 260 can receive and process the Nr received symbol streams from Nr receivers 254 based on a particular receiver processing technique to provide Nt "detected" symbol streams. RX data processor 260 can demodulate, deinterleave, decode, and/or etc., each detected symbol stream to recover the traffic data for the data stream, and provide the traffic data to a data sink 262. In certain embodiments, for mobile device 250, the processing by RX data processor 260 can be complementary to that performed by TX MIMO processor 220 and TX data processor 214 at base station 210.

A processor 270 can periodically determine which precoding matrix to utilize as discussed above. Further, processor 270 can formulate a reverse link message comprising a matrix index portion and a rank value portion. The reverse link message can comprise various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from mobile device 250 are received by Nt antennas 224, conditioned by respective Nt receivers 222, demodulated by a demodulator 240, and processed by a RX data processor 242 to extract the reverse link message transmitted by mobile device 250, and provide the reverse link message to a data sink 244. Further, processor 230 can process the extracted message to determine which precoding matrix to use for determining the beamforming weights.

Processors 230 and 270 can direct (e.g., control, coordinate, manage, etc.) operation at base station 210 and mobile device 250, respectively. Respective processors 230 and 270 can be associated with memory 232 and 272 that store program codes and data. Processors 230 and 270 can also perform computations to derive frequency and impulse response estimates for the uplink and downlink, respectively. All "processor" functions can be migrated between and among process modules such that certain processor modules may not be present in certain embodiments, or additional processor modules not illustrated herein may be present.

Memory 232 and 272 (as with all data stores disclosed herein) can be either volatile memory or nonvolatile memory or can include both volatile and nonvolatile portions, and can be fixed, removable or include both fixed and removable portions. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink™ DRAM (SLDRAM), and direct Rambus™ RAM (DRRAM). Memory 308 of the certain embodiments is intended to comprise, without being limited to, these and any other suitable types of memory.

Exemplary Inter-RAT Handover in Multi-Mode Mobile Stations

According to certain embodiments of the present disclosure, a multi-mode MS may be configured to reallocate some MIMO transmit and receive resources, to provide operation for handover between a first RAT (e.g., WiMAX) and a second RAT (e.g., CDMA or UMTS). This reallocation may allow the MS to perform some light traffic activities in the second RAT, such as handover setup, with little impact on active services in the first RAT.

According to certain embodiments of the present application, the MS may negotiate this reduced MIMO capability mode and associated time intervals with little impact on performance while in traffic mode in the WiMAX network. As a result, handover reliability and disruption may be improved significantly.

The reallocation can allow MS to perform functions associated with a second RAT while in traffic mode of WiMAX network. Such functions may include measuring the signal strength of a second RAT (Receive), acquiring the timing of a second RAT (Receive), acquiring system overhead messages of a second RAT (Receive), and exchanging signaling messages or data with a second RAT, for example, handover signaling to the second RAT (Transmit and Receive).

It may be noted that these functions only require sending or receiving light volumes of data, which may require little processing power. Furthermore, in certain embodiments, the second RAT may not require MIMO capability, so the reallocation of MIMO resources may not greatly impact communication with the WiMAX BS. Other functions which may require light or heavy data volume with the second RAT are also possible.

FIG. 3 illustrates an example of certain embodiments of the present disclosure. In Configuration 1 of FIG. 3, the MS 300 has two transmit MIMO resources 302 and two receive MIMO resources 304 for communicating with a WiMAX BS 306 in MIMO mode. In a scanning interval, the MS 300 can switch to Configuration 2 of FIG. 3. In Configuration 2, the MS 300 is shown with one transmit MIMO resource 302 and one receive MIMO resource 304 in communication with the WiMAX BS 306. One transmit MIMO resource 302' and one receive MIMO resource 304' are shown as reallocated for communication with the second RAT 308. For example, the MS can use the transmit MIMO resource 302' and the receive MIMO resource 304' to measure signal strength and/or exchange signaling message with the second RAT base station 308 to prepare handover. The second RAT base station 308 could be part of a CDMA network, a UTMS network, or any other RAT network. The processor 310 to provide the MAC or Layer 3 protocol stack may be loaded with firmware and software of both RATs while the baseband and RF hardware may be separated.

Figure 4:
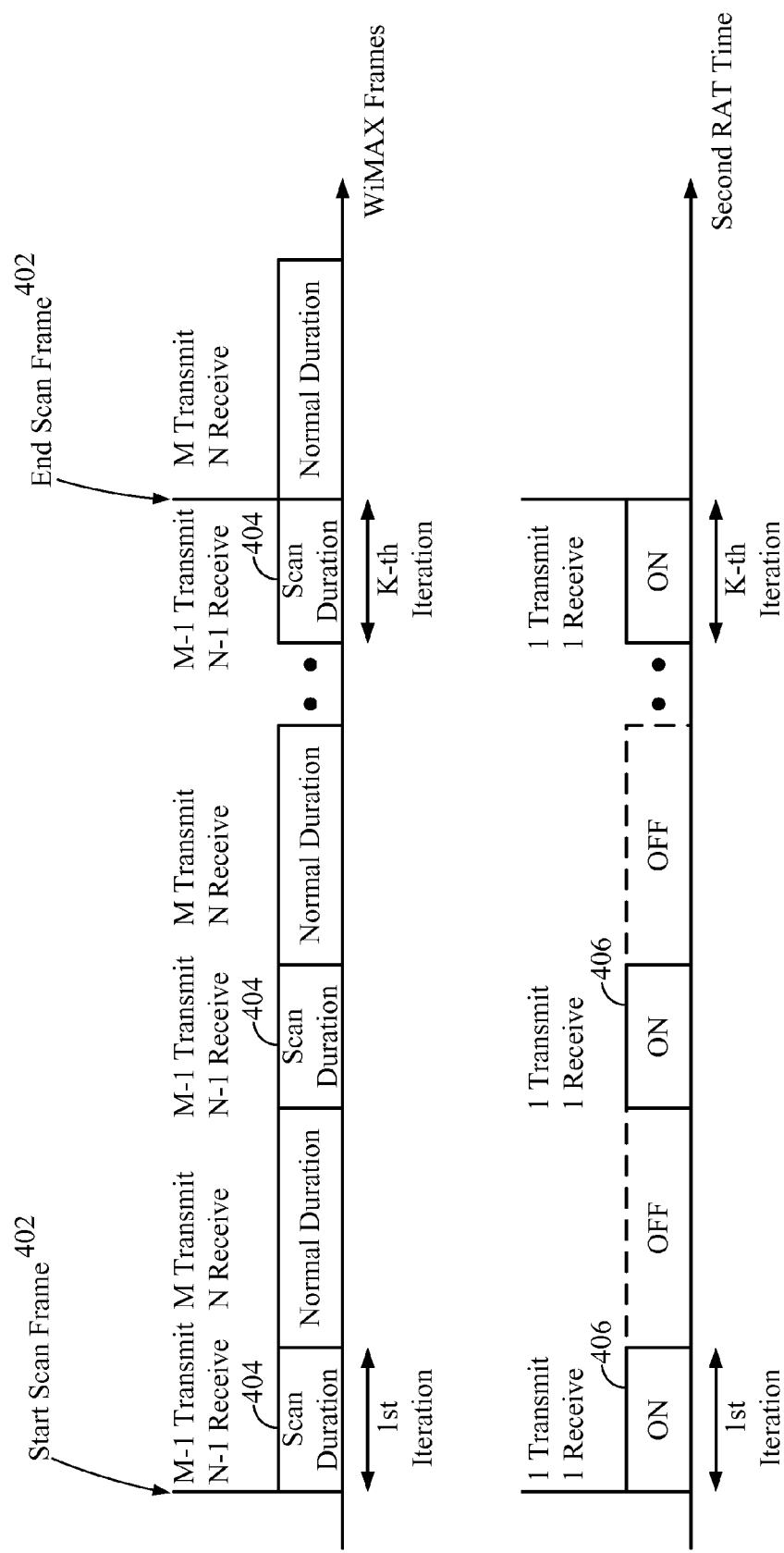
FIG. 4 illustrates an exemplary allocation of resources in accordance with certain embodiments set forth herein.

FIG. 4 illustrates certain embodiments for reallocating MIMO resources, in accordance with aspects of the present disclosure. The illustrated example assumes an MS has M transmit resources and N receive resources.

In FIG. 4, the MS has already negotiated reduced MIMO capability with a first RAT. For example, the MS may have sent the MOB_SCN-REQ message to the WiMAX BS to request when in the frame 402 the MS can reduce MIMO capability to perform activities in the second RAT. As shown in FIG. 4, the MS may transmit and receive with reduced MIMO capability (illustratively, M-1 Transmit and N-1 Receive) during the scanning durations 404 with the WiMAX network. This allows the MS to maintain communication with the first RAT without losing much throughput while performing light activities 406 with the second RAT, such as sending and receiving signaling messages for handover. In the normal duration, or between two scan durations, MS may still operate in the WiMAX network with full MIMO capability (M Transmit and N Receive) as usual.

As an example for certain embodiments, the following message change in MOB_SCN-REQ would allow negotiation for such reduced MIMO capability mode and the associated time intervals:

| Name | Size | Definition | Comments |
|---|---|---|---|
| Reduced MIMO Capability | 8 bits | Bit # 0-3: # of transmits in MIMO remain in the scanning duration<br>Bit # 4-7: # of receives in MIMO remain in the scanning duration | Proposed new TLV |

In case that there is no Reduce MIMO Capability TLV in MOB_SCN-REQ, the WiMAX BS should not send or receive during the scanning interval.

In case that there is a Reduce MIMO Capability TLV in MOB_SCN-REQ, the WiMAX BS may continue to send or receive data with MS in the scanning interval but with reduced MIMO capability. This may involve a slower overall data transmission rate. However, the current standards allow the MS to send a MPDU in the scan duration as an implicit signaling to cancel scanning With MIMO Capability TLV in MOB_SCN-REQ, it is no longer true. MS can only send the MOB_SCN-REQ message with parameter Scan Duration=0 in order to cancel the remaining scanning.

Figure 5:
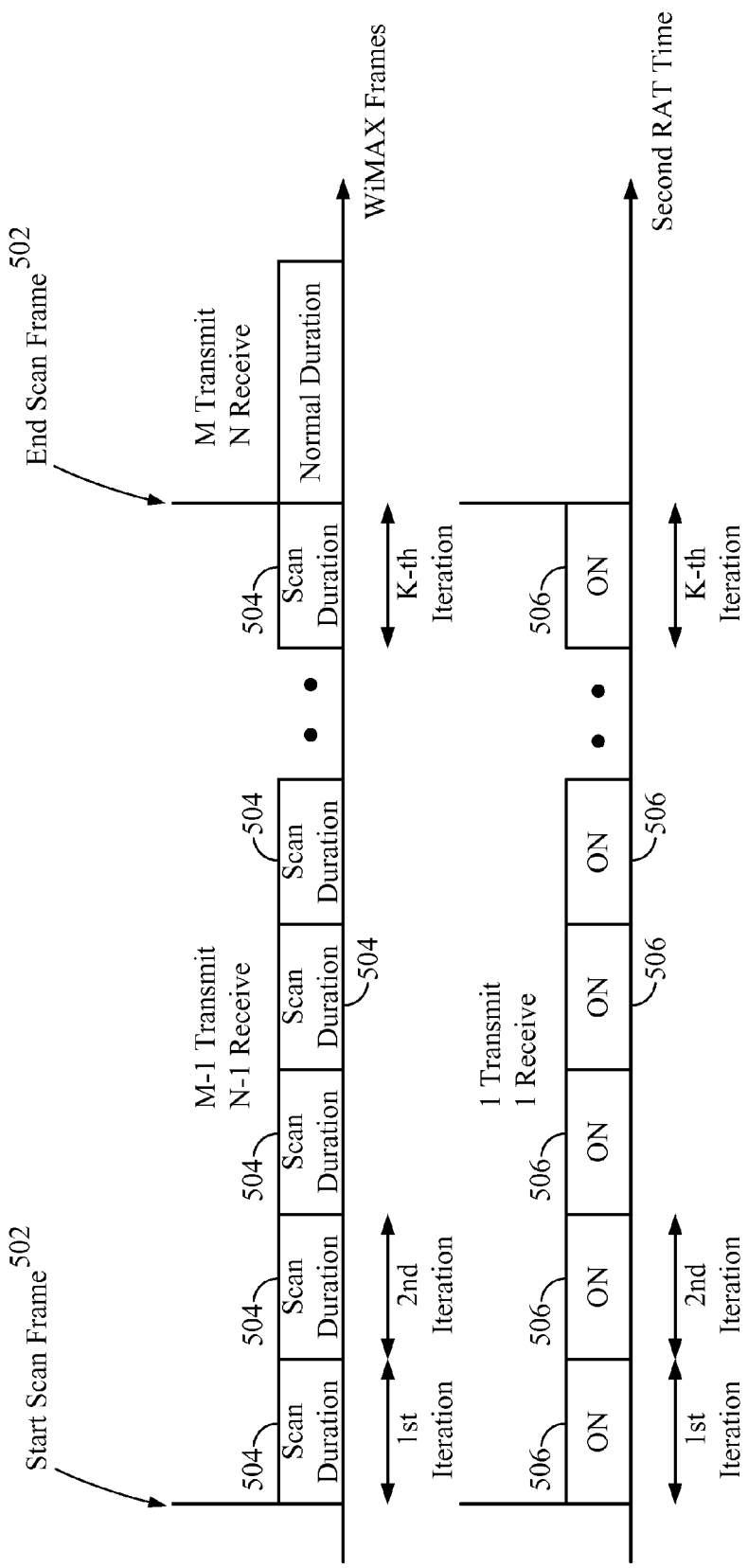
FIG. 5 illustrates an exemplary allocation of resources in accordance with certain embodiments set forth herein.

As shown in FIG. 5, the MS may need to perform activities in the second RAT for a continuous interval. For example, this may be because the BS of the second RAT can send a signaling message at any time after the MS sends the request signaling message. Therefore, continuous monitoring with the second RAT may be required. The MS can request in the MOB_SCN-REQ message with the parameter Interleaving Interval=0, i.e., there is no normal interval between the scan durations 504.

According to certain embodiments of the present application, since the WiMAX standards allow 255 iterations, each of 255 frames per scan duration, MS can continue to operate in such reduced MIMO capability mode for as long as 325 seconds (assuming a 5 ms frame duration: 5 ms×255× 255=325 seconds), which may be sufficient for the MS to perform the desired operations 506 in the second RAT, such as, for example, smooth handover. After the end of all scan iterations, MS may resume normal MIMO mode with the WiMAX BS in normal interval 508. In certain embodiments, the MS may only briefly resume communications with the WiMAX BS, for example to negotiate handover to the second RAT.

FIG. 6 illustrates an example of operations performed by the MS according to certain embodiments of the present application. In 602, the MS informs the BS of a first RAT that the MS will reallocate some MIMO transmit and receive resources and, therefore, MIMO capability in the MS is reduced during some intervals. In 604, The MS receives a message from the BS in the first RAT acknowledging that some MIMO resources in the MS have been reallocated, confirming that the BS in the first RAT will not expect the MS to operate in the full capability of the MIMO mode during some intervals. In a scan duration, shown in 606, the MS communicates with the BS in the first RAT using non-reallocated MIMO resources, and the MS communicates with a BS in a second RAT using the reallocated MIMO resources. In a normal duration, shown in 608, the MS communicates with the BS of the first RAT using reallocated and non-rallocated MIMO resources.

FIG. 7 illustrates examples of means for communicating with a BS according to certain embodiments of the present application. In certain embodiments, an MS includes such means for communicating with a BS. As indicated in 702, the MS includes means for informing the BS of a first RAT that the MS will reallocate some MIMO transmit and receive resources and, therefore, MIMO capability in the MS is reduced during some intervals. In 704, the MS includes means for receiving a response from the BS in the first RAT acknowledging that some MIMO resources in the MS have been reallocated, confirming that the BS in the first RAT will not expect the MS to operate in the full capability of the MIMO mode during some intervals. As shown in 706, the MS includes means for communicating, in a scan duration, with the BS in the first RAT using non-reallocated MIMO resources, and means for communicating with a BS in a second RAT using the reallocated MIMO resources. The MS also includes means for communicating with the BS of the first RAT in a normal duration using reallocated and non-reallocated MIMO resources, shown in 708.

Figures 8, 9:
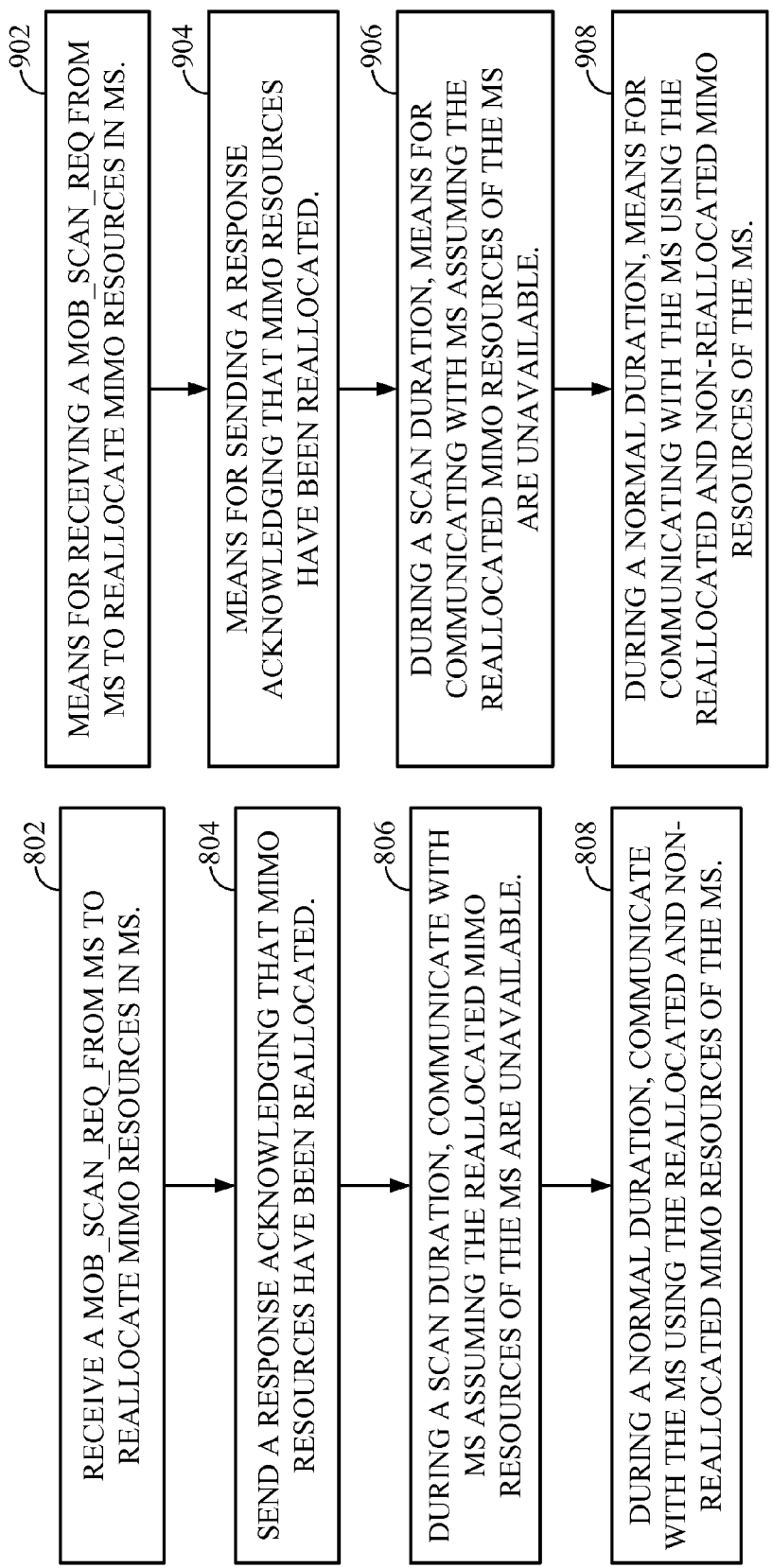
FIG. 8 illustrates example operations performed by a BS, in accordance with certain embodiments as set forth herein.
FIG. 9 illustrates an exemplary means for communicating with an MS in accordance with certain embodiments as set forth herein.

FIG. 8 illustrates an example of operations performed by the BS according to certain embodiments of the present application. In 802, the BS receives a message from the MS that the MS will reallocate some MIMO transmit and receive resources. In 804, the BS sends a response confirming that MIMO resources in the MS have been reallocated. In a scan duration, shown in 806, the BS communicates with the MS assuming that the reallocated MIMO resources of the MS are unavailable. In a normal duration, shown in 808, the BS communicates with the MS using the reallocated and the non-reallocated MIMO resources.

FIG. 9 illustrates examples of means for communicating with an MS according to certain embodiments of the present application. In certain embodiments, a BS in a first RAT includes such means for communicating with an MS. As indicated in 902, the BS includes means for receiving a message from the MS that the MS will reallocate some MIMO transmit and receive resources and, therefore, MIMO capability in the MS is reduced during some intervals. As shown in 904, the BS includes means for sending a response to the MS acknowledging that some MIMO resources of the MS have been reallocated, confirming that the BS in the first RAT will not expect the MS to operate in the full capability of the MIMO mode during some intervals. In 906, the BS includes means for communicating, in a scan duration, with the MS using non-reallocated MIMO resources, i.e., assuming that the reallocated MIMO resources of the MS are unavailable. The BS also includes means for communicating with the MS in a normal duration using reallocated and non-reallocated MIMO resources, shown in 908.

If the MS can complete inter-RAT handover earlier than the end of all scan iterations, MS can cancel the remaining scanning by sending MOB_SCN-REQ with parameter Scan Duration=0.

According to certain embodiments of the present disclosure, the MS and the BS of the WiMAX network may use the scanning request and response messages to negotiate a reduced capability mode and the associated time intervals.

Figure 10:
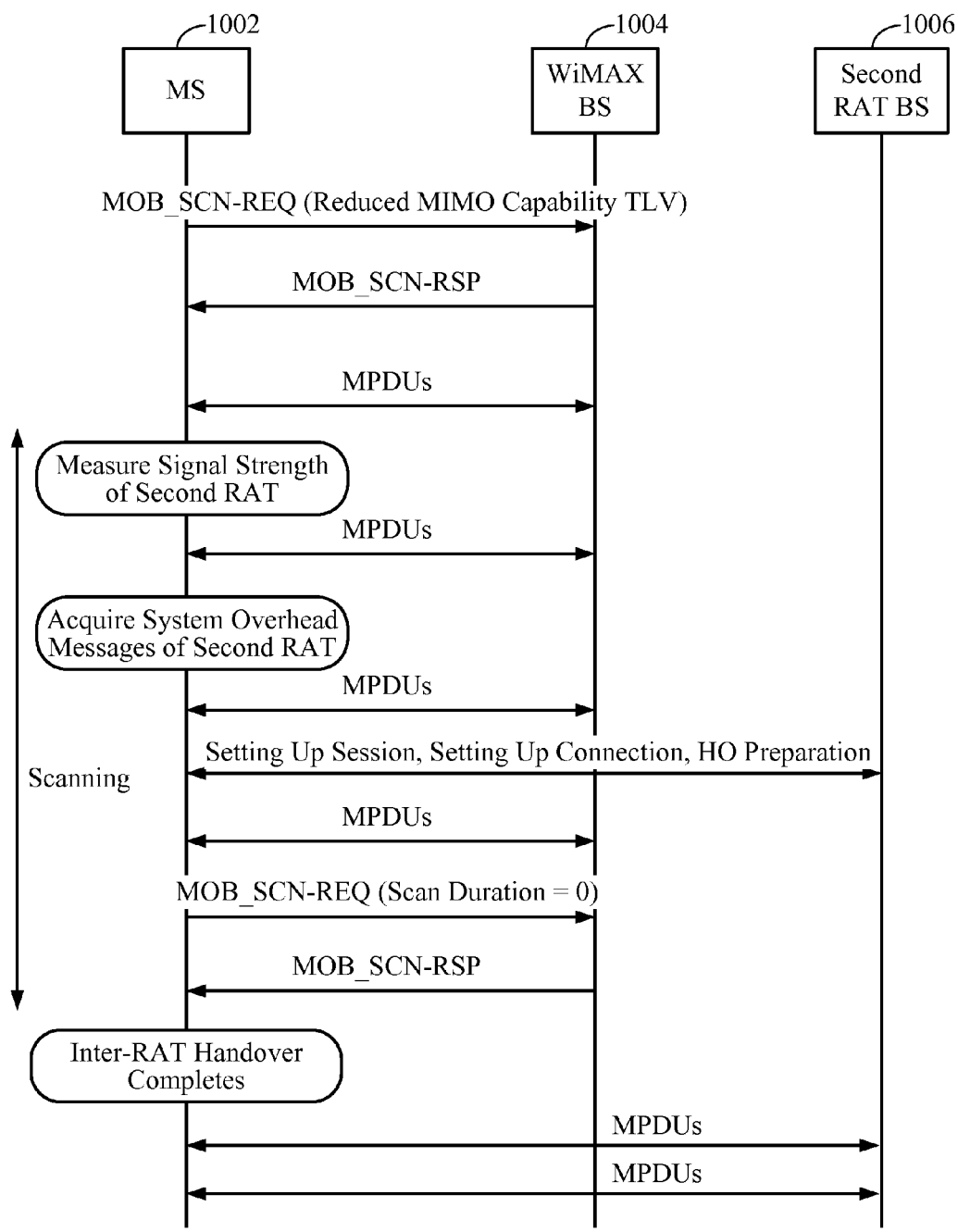
FIG. 10 illustrates an exemplary exchange of commands between an MS and a BS of a WiMAX network, an exemplary exchange of commands between an MS and a BS of a second RAT, and example operations performed by the MS in accordance with certain embodiments as set forth herein.

FIG. 10 illustrates an exemplary exchange of commands between an MS 1002 and a BS 1004 of a WiMAX network, an exemplary exchange of commands between the MS 1002 and a BS 1006 of a second RAT, and example operations performed by the MS 1002 in accordance with certain embodiments as set forth herein. For example, FIG. 10 illustrates that the MS 1002 performs certain functions with respect to the BS 1006 of the second RAT while continuing to communicate with the BS 1004 of the WiMAX network. While the MS 1002 performs certain functions with respect to the BS 1006 of the second RAT, the MS 1002 can communicate with the BS 1004 of the WiMAX network in reduced MIMO capability during certain intervals and full MIMO capability in other intervals. Also, the MS 1002 can communicate with the BS 1004 of the WiMAX network in reduced MIMO capability for a continuous interval while the MS 1002 performs certain functions with respect to the BS 1006 of the second RAT.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 602-608 and 802-804, illustrated in FIGS. 6 and 8, may correspond to blocks 702-708 and 902-908, illustrated in FIGS. 7 and 9.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure, and recited in the claims below, may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method for communicating with a first radio access technology (RAT) and a second RAT, wherein a set of multi-input, multi-output (MIMO) resources is allocated for communication between a mobile station (MS) and a base station (BS) of the first RAT, said method comprising:
   the MS sending to the BS of the first RAT a request message indicating a subset of the set of MIMO resources to reallocate for communication between the MS and a BS of the second RAT during a scan duration, the request message indicating a number of non-reallocated MIMO resources remaining allocated for communication between the MS and the BS of the first RAT during the scan duration;
   during the scan duration, the MS communicating with the BS of the first RAT using the non-reallocated MIMO resources and communicating with the BS of the second RAT using the reallocated MIMO resources; and
   during a normal duration, the MS communicating with the BS of the first RAT using the reallocated and non-reallocated MIMO resources.

2. The method of claim 1 wherein the first RAT is in accordance with one or more standards of the Institute of Electrical and Electronics Engineers (IEEE) 802.16 family of standards.

3. The method of claim 1 wherein sending the BS of the first RAT the request message indicating the subset of the set of MIMO resources to reallocate comprises sending a mobile scan request message indicating the set of MIMO resources to reallocate.

4. The method of claim 1 wherein the second RAT comprises a code division multiple access (CDMA) RAT.

5. A method for communicating with a mobile station (MS), wherein a set of multi-input, multi-output (MIMO) resources is allocated for communication between the MS and a base station (BS) of a first radio access technology (RAT), said method comprising:
   receiving, by the BS of the first RAT, a request message from the MS indicating a subset of the set of MIMO resources of the MS to reallocate for communication between the MS and a BS of a second RAT during a scan duration, the request message indicating a number of non-reallocated MIMO resources remaining allocated for communication between the MS and the BS of the first RAT during the scan duration;
   during the scan duration, the BS of the first RAT communicating with the MS in a first transmission mode assuming use of the non-reallocated MIMO resources by the MS to communicate with the BS of the first RAT and use of the reallocated MIMO resources to communicate with the BS of the second RAT; and
   during a normal duration, the BS of the first RAT communicating with the MS in a second transmission mode assuming use of the reallocated and non-reallocated MIMO resources by the MS to communicate with the BS of the first RAT.

6. The method of claim 5, wherein the first RAT is in accordance with one or more standards of the Institute of Electrical and Electronics Engineers (IEEE) 802.16 family of standards.

7. The method of claim 5, wherein receiving, by the BS of the first RAT, the request message indicating the subset of the set of MIMO resources of the MS to reallocate comprises receiving a mobile scan request message indicating the set of MIMO resources to reallocate.

8. The method of claim 5, wherein the first and second transmission modes have different corresponding data rates.

9. A mobile station (MS) for communicating with a first radio access technology (RAT) and a second RAT, wherein a set of multi-input, multi-output (MIMO) resources is allocated for communication between the MS and a base station (BS) of the first RAT, said mobile station comprising:
  a processor;
  a memory in electronic communication with the processor; and
  instructions stored in the memory and executable by the processor to:
  send to the BS of the first RAT a request message indicating a subset of the set of MIMO resources to reallocate for communication between the MS and a BS of the second RAT during a scan duration, the request message indicating a number of non-reallocated MIMO resources remaining allocated for communication between the MS and the BS of the first RAT during the scan duration:
  during the scan duration, communicate with the BS of the first RAT using the non-reallocated MIMO resources and communicating with the BS of the second RAT using the reallocated MIMO resources; and
  during a normal duration, communicate with the BS of the first RAT using the reallocated and non-reallocated MIMO resources.

10. The mobile station of claim 9, wherein the first RAT is in accordance with one or more standards of the Institute of Electrical and Electronics Engineers (IEEE) 802.16 family of standards.

11. The mobile station of claim 9, wherein the instructions are executable by the processor to send a mobile scan request message indicating the subset of the set of MIMO resources to reallocate.

12. The mobile station of claim 9, wherein the second RAT comprises a code division multiple access (CDMA) RAT.

13. A base station (BS) of a first radio access technology (RAT) for communicating with a mobile station (MS), wherein a set of multi-input, multi-output (MIMO) resources is allocated for communication between the MS and the BS of the first RAT, said base station comprising:
  a processor;
  a memory in electronic communication with the processor; and
  instructions stored in the memory and executable by the processor to:
  receive a request message from the MS indicating a subset of the set of MIMO resources to reallocate for communication between the MS and a BS of the second RAT during a scan duration, the request message indicating a number of non-reallocated MIMO resources remaining allocated for communication between the MS and the BS of the first RAT during the scan duration;
  during the scan duration, communicate with the MS in a first transmission mode assuming use of the non-reallocated MIMO resources by the MS to communicate with the BS of the first RAT and use of the reallocated MIMO resources to communicate with the BS of the second RAT; and
  during a normal duration, communicate with the MS in a second transmission mode assuming use of the reallocated and non-reallocated MIMO resources by the MS to communicate with the BS of the first RAT.

14. The base station of claim 13, wherein the first RAT is in accordance with one or more standards of the Institute of Electrical and Electronics Engineers (IEEE) 802.16 family of standards.

15. The base station of claim 13, wherein the instructions are executable by the processor to receive a mobile scan request message indicating the subset of the set of MIMO resources to reallocate.

16. The base station of claim 13, wherein the first and second transmission modes have different corresponding data rates.

17. A mobile station (MS) for communicating with a first radio access technology (RAT) and a second RAT, wherein a set of multi-input, multi-output (MIMO) resources is allocated for communication between the MS and a base station (BS) of the first RAT, said mobile station comprising:
  means for sending to the BS of the first RAT a request message indicating a subset of the set of MIMO resources to reallocate for communication between the MS and a BS of the second RAT during a scan duration, the request message indicating a number of non-reallocated MIMO resources remaining allocated for communication between the MS and the BS of the first RAT during the scan duration;
  means for, during the scan duration, communicating with the BS of the first RAT using the non-reallocated MIMO resources and communicating with the BS of the second RAT using the reallocated MIMO resources; and
  means for, during a normal duration, communicating with the BS of the first RAT using the reallocated and non-reallocated MIMO resources.

18. The mobile station of claim 17, wherein the first RAT is in accordance with one or more standards of the Institute of Electrical and Electronics Engineers (IEEE) 802.16 family of standards.

19. The mobile station of claim 17, wherein the means for sending to the BS of the first RAT the request message indicating the subset of the set of MIMO resources to reallocate is configured to send a mobile scan request message indicating the set of MIMO resources to reallocate.

20. The mobile station of claim 17, wherein the second RAT comprises a code division multiple access (CDMA) RAT.

21. A base station (BS) of a first radio access technology (RAT) for communicating with a mobile station (MS), wherein a set of multi-input, multi-output (MIMO) resources is allocated for communication between the MS and the BS of the first RAT, said base station comprising:
  means for receiving, by the BS of the first RAT, a request message from the MS indicating a subset of the set of MIMO resources of the MS to reallocate for communication between the MS and a BS of a second RAT during a scan duration, the request message indicating a number of non-reallocated MIMO resources remaining allocated for communication between the MS and the BS of the first RAT during the scan duration;
  means for, during the scan duration, communicating with the MS in a first transmission mode assuming use of the non-reallocated MIMO resources by the MS to communicate with the BS of the first RAT and use of the reallocated MIMO resources to communicate with the BS of the second RAT; and
  means for, during a normal duration, communicating with the MS in a second transmission mode assuming use of the reallocated and non-reallocated MIMO resources by the MS to communicate with the BS of the first RAT.

22. The base station of claim 21, wherein the first RAT is in accordance with one or more standards of the Institute of Electrical and Electronics Engineers (IEEE) 802.16 family of standards.

23. The base station of claim 21, wherein the means for receiving, by the BS of the first RAT, the request message indicating the subset of the set of MIMO resources of the MS to reallocate is configured to receive a mobile scan request message indicating the set of MIMO resources to reallocate.

24. The base station of any of claim 21, wherein the first and second transmission modes have different corresponding data rates.

25. A computer-program storage apparatus for communicating with a first radio access technology (RAT) and a second RAT, wherein a set of multi-input, multi-output (MIMO) resources is allocated for communication between a mobile station (MS) and a base station (BS) of the first RAT, said apparatus comprising a non-transitory computer readable medium having a set of instructions stored thereon, the set of instructions being executable by one or more processors and the set of instructions comprising:
  instructions for sending by the MS to the BS of the first RAT a request message indicating a subset of the set of MIMO resources to reallocate for communication between the MS and a BS of the second RAT during a scan duration, the request message indicating a number of non-reallocated MIMO resources remaining allocated for communication between the MS and the BS of the first RAT during the scan duration;
  instructions for during the scan duration, the MS communicating with the BS of the first RAT using the non-reallocated MIMO resources and communicating with the BS of the second RAT using the reallocated MIMO resources; and
  instructions for during a normal duration, the MS communicating with the BS of the first RAT using the reallocated and non-reallocated MIMO resources.

26. The computer-program storage apparatus of claim 25, wherein the first RAT is in accordance with one or more standards of the Institute of Electrical and Electronics Engineers (IEEE) 802.16 family of standards.

27. The computer-program storage apparatus of claim 25, wherein the instructions for sending the BS of the first RAT the request message indicating the subset of the set of MIMO resources to reallocate comprise instructions for sending a mobile scan request message indicating the set of MIMO resources to reallocate.

28. The computer-program storage apparatus of claim 25, wherein the second RAT comprises a code division multiple access (CDMA) RAT.

29. A computer-program storage apparatus for communicating with a mobile station (MS), wherein a set of multi-input, multi-output (MIMO) resources is allocated for communication between the MS and a base station (BS) of a first radio access technology (RAT), said apparatus comprising a non-transitory computer readable medium having a set of instructions stored thereon, the set of instructions being executable by one or more processors, and the set of instructions comprising:
  instructions for receiving, the BS of the first RAT, a request message from the MS indicating a subset of the set of MIMO resources of the MS to reallocate for communication between the MS and a BS of a second RAT during a scan duration, the request message indicating a number of non-reallocated MIMO resources remaining allocated for communication between the MS and the BS of the first RAT during the scan duration;
  instructions for, during the scan duration, the BS of the first RAT communicating with the MS in a first transmission mode assuming use of the non-reallocated MIMO resources by the MS to communicate with the BS of the first RAT and use of the reallocated MIMO resources to communicate with the BS of the second RAT; and
  instructions for, during a normal duration, the BS of the first RAT communicating with the MS in a second transmission mode assuming use of the reallocated and non-reallocated MIMO resources by the MS to communicate with the BS of the first RAT.

30. The computer-program storage apparatus of claim 29, wherein the first RAT is in accordance with one or more standards of the Institute of Electrical and Electronics Engineers (IEEE) 802.16 family of standards.

31. The computer-program storage apparatus of claim 29, wherein the instructions for receiving, by the BS of the RAT, the request message indicating the subset of the set of MIMO resources of the MS to reallocate comprise instructions for receiving a mobile scan request message indicating the set of MIMO resources to reallocate.

32. The computer-program storage apparatus of claim 29, wherein the first and second transmission modes have different corresponding data rates.

* * * * *